United States Patent [19]

Surash et al.

[11] Patent Number: 5,500,328
[45] Date of Patent: Mar. 19, 1996

[54] RECOVERY OF PHOTOGRAPHIC FILM BASE

[75] Inventors: Robert G. Surash; Craig C. Lewis, both of Rochester, N.Y.

[73] Assignee: Eastman Kodak Company, Rochester, N.Y.

[21] Appl. No.: 372,276

[22] Filed: Jan. 12, 1995

[51] Int. Cl.$^6$ .............................. C08B 3/26; G03C 11/24
[52] U.S. Cl. .............................................. 430/347; 536/78
[58] Field of Search ................................. 536/78; 430/347

[56] References Cited

U.S. PATENT DOCUMENTS

| | | | |
|---|---|---|---|
| 1,844,711 | 2/1932 | Allen | 8/102 |
| 1,897,878 | 2/1933 | Allen | 536/78 |
| 1,925,564 | 9/1933 | Murray et al. | 536/78 |
| 1,930,133 | 10/1933 | Reid | 536/78 |
| 2,688,614 | 9/1954 | Fox | 536/78 |
| 3,546,149 | 12/1970 | Fabian | 536/78 |
| 3,956,088 | 5/1976 | Fassell et al. | 204/109 |

FOREIGN PATENT DOCUMENTS

| | | | |
|---|---|---|---|
| 4350856 | 12/1992 | Japan | G03C 11/24 |
| 5281686 | 10/1993 | Japan | G03C 11/24 |
| 1191876 | 11/1985 | U.S.S.R. | |
| 1205118 | 1/1986 | U.S.S.R. | |
| 1216766 | 3/1986 | U.S.S.R. | |
| 1282064 | 1/1987 | U.S.S.R. | |
| 1282063 | 1/1987 | U.S.S.R. | |
| 1418639 | 8/1988 | U.S.S.R. | |

OTHER PUBLICATIONS

Research Disclosure, Oct. 1974, Item No. 12629, published by Kenneth Mason Publications, Ltd., Dudley Annex, 12a North Street, Emsworth, Hampshire P010 7DQ, England.
Research Disclosure, Aug. 1980, Item No. 19634, publisehd by Kenneth Mason Publications, Ltd., Dudley Annex, 12a North Street, Emsworth, Hampshire P010 7DQ, England.

*Primary Examiner*—Charles L. Bowers, Jr.
*Assistant Examiner*—Mark F. Huff
*Attorney, Agent, or Firm*—Joshua G. Levitt

[57] ABSTRACT

A process is described for recovering cellulose triacetate from scrap photographic film, using aqueous solutions free of organic solvents, by the steps of:

a) reducing the film to segments of handlable size;
b) oxidizing the film with an oxidizing agent comprising an alkali metal permanganate and a strong acid;
c) oxidizing the product of step b) with an alkali metal hypochlorite to remove stain from iron compound and yellow dye;
d) bleaching the product of step c) with an alkali metal metabisulfite in an acidic environment; and
e) recovering cellulose triacetate.

The recovered cellulose triacetate prepared in accordance with this invention has essentially the same spectral absorption at 400 nm as virgin cellulose triacetate and can be used to prepare photographic film base of acceptable color purity.

7 Claims, No Drawings

RECOVERY OF PHOTOGRAPHIC FILM BASE

FIELD OF THE INVENTION

This invention relates to recovery of cellulose acetate from photographic film, in particular from cellulose triacetate that has been used as the support for photographic motion picture film.

BACKGROUND OF THE INVENTION

Photographic film comprises a light sensitive coating on a polymeric support. Since about 1930 the support material of choice has been cellulose triacetate (sometimes called cellulose acetate). Once the film had been used it is possible to recover the support material for reuse of the polymer by separating the light sensitive coating from the polymer support and then treating the support. Numerous ways have been devised for recovery of cellulose acetate from film supports.

Research Disclosure Item 12629, published October 1974, Research Disclosure Item 19634, published August, 1980, U.S. Pat. No. 1,844,711 dated Feb. 9, 1932 and U.S. Pat. No. 3,956,088 dated May 11, 1976 describe some techniques for treating film supports to recover polymer from them.

In a series of Russian patent abstracts (SU 1191876, 1205118, 1216766, 1282063, 1282064, and 1418639) published between 1985 and 1988, Tereshkova describes recovery of cellulose triacetate film using combinations of various oxidizing and reducing agents.

In Japanese Kokai 04-350856, dated Dec. 4, 1992 and 05-281686, dated Oct. 29, 1993 there is described recovery of cellulose esters using a halogen oxide oxidizing agent in combination with either a manganese or peroxide oxidizing agent. These processes use organic solvents and/or hydrogen peroxide, both of which are undesirable in an operation run on a commercial scale.

A common commercial procedure for recovering cellulose triacetate polymer from used motion picture film involves size reduction followed by treatment with sodium hydroxide, potassium permanganate and sulfuric acid, sodium metabisulfite and washing with water. The size reduction gets the film in a form that it can be readily handled and acted upon by the chemical agents which follow. Treatment with sodium hydroxide hydrolizes the gelatin in the coatings on the film support and prepares the various layers for oxidation and removal. Treatment with potassium permanganate and sulfuric acid oxidizes the components of the various layers. Treatment with sodium metabisulfite neutralizes the oxidizing agents and bleaches any brown stain attributed to manganese dioxide. Water washing removes the reaction by products and suspended particles from the cellulose triacetate slurry. The freshly washed support is recovered by drying.

While this process provides cellulose triacetate which is useful for a number of applications, a problem with it is that with some sources of film base, such as that which has been used as motion picture film, the process does not yield a product that is sufficiently colorless that it can be used to prepare photographic film base. Rather, the cellulose acetate resulting from this process has a yellow to brown color which renders the polymer unsuitable for use as a support for photographic film. None of the art relating to the recovery of cellulose acetate provides a suggestion as to how to eliminate the color in the recovered product.

We have determined that the color is attributable to dye and iron compounds that are present in the photographic film and that these compounds are not removed or destroyed by the recovery processes heretofore used. We have found that cellulose acetate of acceptable color purity can be prepared by a process which has as one significant feature the use of a separate hypochlorite oxidizing step. We also have found that elimination of the sodium hydroxide treatment improves the color of the recovered product.

SUMMARY OF THE INVENTION

The process of this invention comprises recovering cellulose triacetate from scrap photographic film, using aqueous solutions free of organic solvents, by the steps of:

a) reducing the film to segments of handlable size;

b) oxidizing the film with an oxidizing agent comprising an alkali metal permanganate and a strong acid;

c) oxidizing the product of step b) with an alkali metal hypochlorite to remove stain from iron compound and yellow dye;

d) bleaching the product of step c) with an alkali metal metabisulfite in an acidic environment; and e) recovering cellulose triacetate.

The recovered cellulose triacetate prepared in accordance with this invention has essentially the same spectral absorption at 400 nm as virgin cellulose triacetate when each is dissolved at a 15% by weight solution in a blend of methylene chloride/methanol at a ratio of 97:3 parts by weight. Thus, this cellulose acetate is useful in application where color purity is significant, such as in the preparation of photographic film base.

DETAILED DESCRIPTION OF THE INVENTION

The present invention is carried out in standard industrial equipment which would not be corroded by the solutions used. Depending upon the particular reagents used, the reactions can be carried out in glass lined reactors, titanium reactors or non-corroding alloy reactors. Pipes, pumps and other handling equipment should have similar properties. The reagent that places the most demands on the system is sodium hypochlorite which, at elevated temperatures, is very corrosive.

In accordance with this invention, scrap film to be recovered can be reduced in size by standard chopping equipment. Typically after size reduction the film particles have a size in the range of about 0.5 to 3 mm. in diameter and comprise the film base coated with various photographic layers. These can include layers of gelatin and synthetic polymers containing organic dyes, silver and silver halide, inorganic compounds used as antistatic agents and for magnetic sound tracks, as well as other compounds. The film base typically constitutes on the order of 75 to 90 percent by volume of an individual particle.

The particles of film base are washed with water and then transferred to a vessel where they can be agitated, treated with chemical reagents and rinsed. A suitable vessel is a reactor equipped with an impeller and a strainer. While the particles are being treated, the agitation cause a scrubbing action of the particles against one another. This helps to separate the coated photographic layers from film base and also reduces the size of the coating particles that have been separated. Rinsing between chemical reaction steps removes water soluble reaction products and permits removal from the slurry of the small coating particles that have been separated from the film base.

In the first chemical reaction step the particles of film base are treated with potassium permanganate, or an equivalent oxidizing agent, under acidic conditions for a time and at a temperature that will oxidize a substantial part of the gelatin layers and the compounds contained in them. The acid employed preferably is concentrated sulfuric acid, but other strong acids can be used. Its purpose is to provide an acidic environment in which the permanganate will act as an oxidizing agent. Details as to preferred concentrations, proportions, times, and temperatures for this step are provided in Table I below. This step is intended to at least initiate the removal of the dyes which formed the image in the film, other dyes that are in the film for other purposes, any magnetic sound track on the film, as well as subbing layers and their components.

Following this oxidizing treatment the slurry is thoroughly washed with water.

In the next chemical reaction step the slurry is treated with sodium hypochlorite, or an equivalent halogen oxidizing agent, to continue the oxidation of the components of the photographic layers. Details as to preferred concentrations, proportions, times, and temperatures for this step are provided in Table I, below. The purpose of this step is to complete the removal of the compounds whose removal was initiated in the permanganate oxidation step. This step is the key to obtaining a product with good color characteristics when the film base is coated with layers that contain iron compounds. The hypochlorite oxidizes the iron compounds to a form which can be removed during subsequent washing. The hypochlorite oxidizing agent in addition effectively removes the yellow image dye which is a significant source of stain in the prior process. As shown in Table I below, a wide range of times, temperatures and concentrations can be used. It is preferred for an industrial operation that times at the shorter end of the range and temperatures and concentrations at the higher end of the range be employed.

Following this oxidizing treatment the slurry is washed thoroughly with water.

In the next chemical reaction step the slurry is treated with a sodium metabisulfite bleaching agent, or an equivalent bleaching agent in an acidic environment. Details as to preferred concentrations, proportions, times, and temperatures for this step are provided in Table I below. This bleach step has as its principal purpose the removal of any residual chloride remaining from the previous oxidation step. It has as a secondary purpose the removal of any residual yellow dye. The removal of chloride from the slurry is important to the subsequent handling of the slurry and dopes made from it which are used in the casting of photographic film base. If chloride is carried into subsequent operations where it can come into contact with water, it can lead to undesirable corrosion of equipment.

After this bleaching step, the slurry is again thoroughly washed with water.

The resulting cellulose triacetate slurry can be recovered and reused by the same techniques as have been used previously in the art. The slurry can be dried as a film on a concurrent rotary drier, with microwave energy or by any other known means that does not raise the temperature of the slurry so high as to discolor it. Details as to preferred times and temperatures for this step are provided in Table I, below.

TABLE I

| Step/Composition | Proportions | | Time | | Temperature | |
|---|---|---|---|---|---|---|
| | Range % | Pref % | Range min. | Pref min. | Range °C. | Pref °C. |
| Oxidation/ | | | 15–60 | 30 | 75–99 | 95 |
| Sulfuric acid, commercial grade, 93–96%, and | 1–5 | 2.5 | | | | |
| Potassium permanganate, technical grade | 1–5 | 1 | | | | |
| Wash/Water | 500–1500 | 1000 | 5–40 | 15 | 3–99 | 10 |
| Oxidation/ | | | 30–4320 | 240 | 25–99 | 95 |
| Sodium hypochlorite, commercial grade, 12.5% | 50–500 | 125 | | | | |
| Wash/ Water | 500–1500 | 1000 | 5–60 | 15 | 3–99 | 10 |
| Bleach/ | | | 5–30 | 10 | 75–99 | 95 |
| Sulfuric acid, commercial grade, 93–96%, and | 1–5 | 2.5 | | | | |
| Sodium metabisulfite, photo grade | 1–5 | 1 | | | | |
| Wash/Water | 500–1500 | 1000 | 5–60 | 15 | 3–99 | 10 |
| Drying | | | 60–480 | 240 | 80–160 | 120 |

WORKING EXAMPLES

A preferred way of practicing this invention is shown in Example 1, which follows. While this example is on a small scale, operation on an industrial scale would employ similar concentrations, proportions, times and temperatures. Example 2 shows a similar process using the prior process discussed above. Material prepared by the process of Example 2 does not have the same color purity as does material prepared by the process of Example 1.

Example 1

Below are listed the equipment and chemicals for recovering in a small scale operation processed/developed cellulose acetate motion picture film.

3000 mL glass beaker or 100% titanium bucket
1500 mL plastic strainer that fits inside the beaker or bucket
External mixing (air or electrical) with an impeller having a glass shaft and Teflon blades
A 2–4" flexible elephant exhaust tube (>400 cfm)
Tap water: cold (3°–10° C.); and, hot (98°–99° C.)
Hot plate (500–2000 watts)
Alcohol filled thermometer (0°–200° C. range)
Drying oven (100°–200° C. range)
"Commercial Grade" 95% sulfuric acid solution
"Technical Grade" potassium permanganate
"Photo Grade" sodium metabisulfite
"Commercial Grade" 12.5% sodium hypochlorite solution Below is a small scale procedure for recovering processed/developed cellulose acetate motion picture film.

1. Load 200 g of chopped film support into the 1500 mL strainer.
2. Transfer strainer to the 3000 mL beaker or bucket.
3. Add 2000 g of 98°–99° C. tap water to the beaker or bucket.
4. Transfer beaker or bucket w/strainer/film/water to a hot plate.
5. Position the agitator/impeller; fix the rate of agitation at 400 rpm.
6. Heat film/water slurry to 98°–99° C. ±1° C.
7. Add 2.5% by film weight 93% sulfuric acid solution. Wait 1 minute.
8. Add 1% by film weight potassium permanganate.
9. React for 30 minutes.
10. Drain aqueous layer from beaker/bucket by slowly lifting out strainer.
11. Repeat Steps 2, 3 (3°–10° C. tap water), 4 and 5 (stir for 5 minutes).
12. Repeat Step 10.
13. Repeat Step 11.
14. Repeat Step 10.
15. Repeat Step 11.
16. Repeat Step 10.
17. Repeat Steps 2, 3, 4, 5 and 6; but use 1800 g 98°–99° C. tap water.
18. Add 125% by film weight 12.5% sodium hypochlorite solution.
19. React for 240 minutes.
20. Repeat Step 10.
21. Repeat Step 11.
22. Repeat Step 10.
23. Repeat Step 11.
24. Repeat Step 10.
25. Repeat Step 11.
26. Repeat Step 10.
27. Repeat Steps 2, 3, 4, 5 and 6.
28. Add 2.5% by film weight 93% sulfuric acid solution. Wait 1 minute.
29. Add 1% by film weight sodium metabisulfite.
30. React for 15 minutes.
31. Repeat Step 10.
32. Repeat Step 11.
33. Repeat Step 10.
34. Repeat Step 11.
35. Repeat Step 10.
36. Repeat Step 11.
37. Repeat Step 10.
38. Place washed film in a ceramic dish or on aluminum foil.
39. Transfer to a drying oven at 120° C. ±5° C. for 8 hours.

To test the color purity of the product of this example, a standard solvent blend was prepared comprising 97:3 percent by weight of methylene chloride and methanol. A standard dope was prepared by dissolving 15% by weight of virgin cellulose acetate in the solvent blend. A second dope was prepared by dissolving 15% by weight of a sample of the product obtained above in the solvent blend. The transmittance at 400 nm of the two dopes was compared in a spectrophotometer (Milton Roy Spectronic 20 Series spectrophotometer, available from Milton Roy Company, Analytical Products Division, Rochester, N.Y. 14625). The two dopes had essentially the same transmittance, indicating that the product obtained in the example was suitable for use in the preparation of photographic film base.

Example 2

Below are listed the equipment and chemicals for a prior small scale process for recovering scrap cellulose acetate film.

3000 mL stainless steel (316SS) bucket
1500 mL plastic strainer that fits inside 316SS bucket
External mixing (air or electrical) with impeller having a stainless steel shaft and stainless steel blades
A 2–4" flexible elephant exhaust tube (>400 cfm)
Tap water: cold (3°–10° C.); and, hot (98°–99° C.)
Hot plate (500–2000 watts)
Stainless steel-tipped thermometer (0°–200° C. range)
Drying oven (100°–200° C. range)
"Standard Grade" 50% sodium hydroxide solution
"Commercial Grade" 95% sulfuric acid solution
"Technical Grade" potassium permanganate
"Photo Grade" sodium metabisulfite Below is a prior small scale process for recovering cellulose acetate film.

1. Load 200 g of chopped film support into the 1500 mL strainer.
2. Transfer strainer to the 3000 mL 316SS bucket.
3. Add 2000 g of 98°–99° C. tap water to the 316SS bucket.
4. Transfer 316SS bucket w/strainer/film/water to a hot plate.
5. Position the agitator/impeller; fix the rate of agitation at 400 rpm.
6. Heat film/water slurry to 98°–99° C. ±1° C.
7. Add 4% by film weight 50% sodium hydroxide solution.
8. React for 30 minutes.
9. Drain aqueous layer from 316SS bucket by slowly lifting out strainer.
10. Add 2000 g 3°–10° C. tap water to the 316SS bucket.
11. Repeat Step 2.
12. Repeat Step 5 for 5 minutes.
13. Repeat Step 9.
14. Repeat Steps 2, 3, 4, 5 and 6.
15. Add 2.5% by film weight of 93% sulfuric acid solution. Wait 1 minute.
16. Add 1% by film weight potassium permanganate.
17. React for 30 minutes.
18. Add 1% by film weight sodium metabisulfite.
19. React for 10 minutes.
20. Repeat Step 9.
21. Repeat Steps 2, 3, 4 and 5 (stir for 5 minutes).
22. Repeat Step 9.
23. Repeat Steps 2, 10, and 5 (stir for 5 minutes).
24. Repeat Step 9.
25. Repeat Step 23 two times in a row.
26. Repeat Step 9.
27. Place washed film in a ceramic dish or on aluminum foil.
28. Transfer to a drying oven at 120° C. ±5° C. for 8 hours.

Color purity of this product was tested using the same procedure and equipment as in Example 1. A dope prepared by dissolving the product of this example in the standard solvent mixture had significantly greater absorption at a wavelength of 400 nm than did a similar dope prepared from virgin cellulose acetate. This indicates that the prior process does not yield a product that would have the requisite color purity to be useful for making photographic film base.

The invention has been described by reference to preferred embodiments, but it will be understood changes can be made to the apparatus and process steps specifically described herein within the spirit and scope of the invention.

What is claimed is:

1. A process of recovering cellulose triacetate from scrap photographic film, using aqueous solutions free of organic solvents, by the steps of:
   a) reducing the film to segments of handlable size and combining the segments with water to form an aqueous slurry;
   b) oxidizing the film with an oxidizing agent comprising an alkali metal permanganate and a strong acid;
   c) oxidizing the slurry resulting from step b) with an alkali metal hypochlorite to remove stain due to iron compound and yellow dye;
   d) bleaching the slurry resulting from step c) with an alkali metal metabisulfite in an acidic environment; and
   e) recovering cellulose triacetate.

2. A process of claim 1, wherein the scrap film is motion picture film which contains magnetic particles.

3. A process of claim 1, wherein between each of the steps the slurry is thoroughly washed with water.

4. A process of claim 1, wherein step b) is performed using potassium permanganate and sulfuric acid.

5. A process of claim 1, wherein step c) is performed using sodium hypochlorite.

6. A process of claim 1, wherein step d) is preformed using sodium metabisulfite and sulfuric acid.

7. A process of recovering cellulose triacetate from scrap photographic motion picture film containing magnetic particles, using aqueous solutions free of organic solvents, by the steps of:
   a) reducing the film to segments of handleable size and combining the segments with 10 parts by weight water for each part by weight film to form an aqueous slurry;
   b) oxidizing the film, with an oxidizing agent comprising 1 to 5% by weight, based on the weight of the film, of potassium permanganate and 1 to 5% by weight, based on the weight of the film, of sulfuric acid, for a time of 15 to 60 minutes and at a temperature of 75° to 99° C., while agitating the slurry;
   c) oxidizing the slurry resulting from step b) with an oxidizing agent comprising 50 to 500% by weight, based on the weight of the film, of sodium hypochlorite, for a time of 30 to 4320 minutes and at a temperature of 25° to 99° C. while agitating the slurry;
   d) bleaching the slurry resulting from step c) with a bleaching composition comprising 1 to 5% by weight, based on the weight of the film, of sodium metabisulfite and 1 to 5% by weight, based on the weight of the film, of sulfuric acid, for a time of 5 to 30 minutes and at a temperature of 75° to 99° C., while agitating the slurry;
   e) recovering cellulose triacetate by drying the slurry resulting from step d) for a time of 60 to 480 minutes and at a temperature of 80° to 160° C.; and
   f) after each of step b), c) and d) washing the composition with 500 to 1500% by weight of water, based on the weight of the film, for a time of 5 to 60 minutes and at a temperature of 3° to 99° C.

* * * * *